(12) United States Patent
Johnson

(10) Patent No.: US 6,943,690 B2
(45) Date of Patent: Sep. 13, 2005

(54) FLOW VERIFICATION MECHANISM

(75) Inventor: David R. Johnson, Woodbury, MN (US)

(73) Assignee: Ecolab Inc., St. Paul, MN (US)

( * ) Notice: Subject to any disclaimer, the term of this patent is extended or adjusted under 35 U.S.C. 154(b) by 159 days.

(21) Appl. No.: 10/655,160

(22) Filed: Sep. 4, 2003

(65) Prior Publication Data
US 2005/0062610 A1 Mar. 24, 2005

(51) Int. Cl.⁷ .............................................. G08B 21/00
(52) U.S. Cl. ................... 340/606; 340/609; 73/861.05; 73/861.56; 73/223
(58) Field of Search ................................ 340/506, 603, 340/606, 607, 608, 609, 610, 611; 73/861.56, 861.57, 861.58, 744, 861.05, 223

(56) References Cited

U.S. PATENT DOCUMENTS

| | | | |
|---|---|---|---|
| 4,003,255 A | 1/1977 | Spencer | |
| 4,486,744 A | 12/1984 | Pratt et al. | |
| 4,669,308 A | * 6/1987 | Jorritsma | 73/223 |
| 4,763,114 A | 8/1988 | Eidsmore | |
| 4,856,343 A | * 8/1989 | Hon | 73/861 |
| 4,937,558 A | 6/1990 | Robinet et al. | |
| 4,938,072 A | * 7/1990 | Brown et al. | 73/861 |
| 5,142,271 A | 8/1992 | Bailey et al. | |
| 5,695,092 A | * 12/1997 | Schrandt | 222/1 |
| 5,877,417 A | * 3/1999 | Arvidson et al. | 73/215 |

* cited by examiner

Primary Examiner—Toan N. Pham
(74) Attorney, Agent, or Firm—IPLM Group, P.A.

(57) ABSTRACT

A flow verification sensor apparatus (30) is used with a constant volume pump (11) that pumps a liquid product (13) from a container (12). A plummet (32) is positioned in a flow tube (31). A sensor (33) is positioned upward from the lower end of the flow tube (31). A timer (34) measures the length of time for the plummet (32) to move from a first position to a second position after activation of the pump (11). Suitable alarms (50) are operated to indicate low flow or out of product conditions.

13 Claims, 3 Drawing Sheets

FLOW VERIFICATION MECHANISM

BACKGROUND OF THE INVENTION

1. Field of the Invention

This invention relates generally to a flow sensor, and more particularly to a flow sensor for determining if a proper quantity of liquid is being delivered in a delivery system.

2. Description of the Prior Art

Constant volume pumps are universally used as the least expensive dispensing method for delivering small quantities of liquids to applications. Constant volume pumps consist of a flexible elastomer tube, a rotor and a small motor. When power is applied to the motor, it turns the rotor and collapses the tube, which squeezes liquid out of the tube and to the application. Constant volume pumps are capable of delivering very small volumes of liquid at constant flow rates. This allows for the pumps to be controlled by simple timers to deliver a pre-determined amount of liquid. Some problems that are associated with constant volume pumps include that the pump tube wears out over time and has to be replaced. Service personnel typically replace the tubes according to a maintenance schedule. In addition, as the pump tubes wear, the volume they pump may change, possibly to the point where they are no longer pumping the required volumes to the application. Still another problem is that when the dispensed liquid container goes empty, the pump will not give any indication to the customer to replace the liquid container.

The present invention addresses the problems associated with the prior art constant volume pumps and provides for a flow verification mechanism for use with such constant volume pumps, constant volume pumps or other type of pumps.

SUMMARY OF THE INVENTION

In one embodiment, the invention is a flow verification sensor apparatus for use with a constant volume pump that pumps a liquid product from a container. The apparatus includes a flow tube having a bore, the flow tube having an upper end and a lower end. The upper end is adapted and configured to be in fluid communication with the constant vacuum pump and the lower end is adapted and configured to be in fluid communication with the liquid product. A plummet is positioned in the bore of the flow tube. A sensor is positioned proximate the flow tube and at an upward distance from the lower end. The plummet is moveable from a first, at rest position to a second position, wherein the sensor senses the plummet. A timer is utilized for measuring a length of time for the plummet to move from the first position to the second position after activation of the pump, the plummet being raised by flow of the liquid product.

In another embodiment, the invention is a dispensing system for dispensing a liquid product. The system includes a constant volume pump. A flow tube has a bore. The flow tube has an upper end and a lower end. The upper end is adapted and configured to be in fluid communication with the constant vacuum pump and the lower end is adapted and configured to be in fluid communication with the liquid product. A plummet is positioned in the bore of the flow tube. A sensor is positioned proximate the flow tube at an upward distance from the lower end. A conduit, having a first end in fluid communication with the lower end of the flow tube and a second end, in fluid communication with the liquid product is provided. The plummet is moveable from a first, at rest position to a second position, when the sensor senses the plummet. A timer is provided for measuring a length of time for the plummet to move from the first position to the second position after activation of the pump.

In another embodiment, the invention is a method of priming a dispenser system for dispensing a liquid product. The method includes activating a pump for dispensing the liquid and establishing a maximum priming time. A plummet is positioned in a bore of a flow tube, through which the liquid flows. A sensor is positioned proximate the flow tube to sense the plummet rising in the flow tube due to flow of the liquid product. The flow time is measured and the pump is run until the sensor sees the plummet or until the flow time exceeds the maximum priming time, whichever occurs first.

DETAILED DESCRIPTION OF A PREFERRED EMBODIMENT

Figure 1:
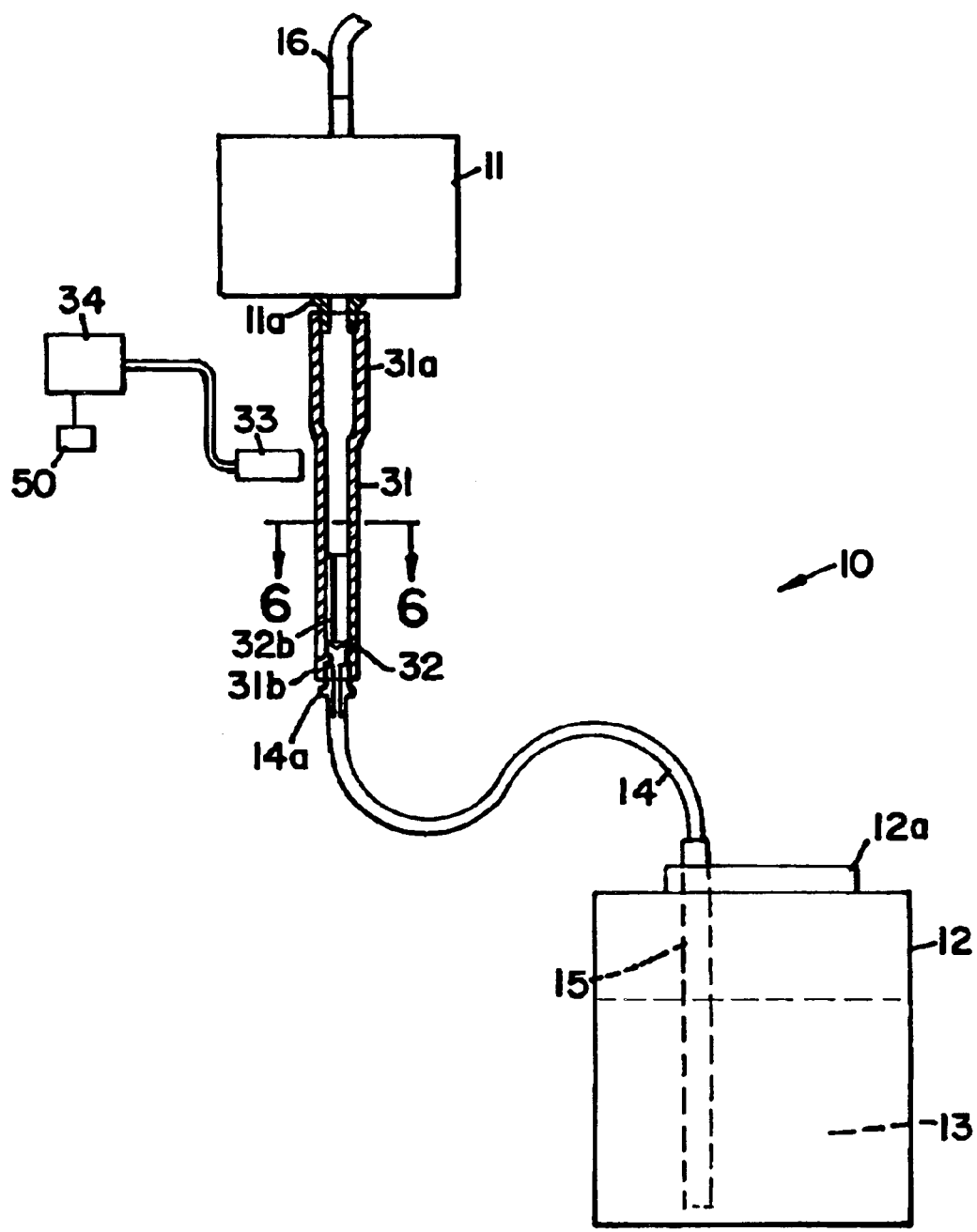
FIG. 1 is a schematic elevational view of the present invention shown in use with a dispensing system.

Referring to the drawings, wherein like numerals represent like parts throughout the several views, there is generally disclosed at 10 a dispensing system. A flow verification sensor apparatus, generally designated as 30, is shown in use in the dispensing system 10. The dispensing system 10 includes a constant volume pump, or constant volume pump 11 in fluid communication with a product container 12 in which a liquid product 13 is contained. A conduit or tube 14 is suitably positioned in the product container 12 through a cap 12a. The cap 12a may have a rigid member 15 that has a bore extending thereto so as to place the liquid product 13 in fluid communication with the tube 14. Alternately the tube 14 could extend to proximate the bottom of container 12. The constant volume pump 11 has a discharge tube 16 through which the liquid product 13 is pumped to a particular application. It is understood that the type of liquid product 13 that is used could be a sanitizer for use in a ware washing application. However, it is understood that other suitable liquid products and applications may be used while using the present invention.

The flow verification sensor apparatus 30 includes a flow tube 31 having a first end 31a and a second end 31b. The first end 31a is adapted and configured to be connected to and in fluid communication with an inlet 11a of the constant volume pump 11. The second end 31b is adapted and configured to be connected to and in fluid communication with the tube 14. The tube 14 may have a connector 14a operatively connected thereto to facilitate connection to the flow tube 31. A plummet or bob 32 is generally cylindrical in shape and is sized smaller than the inside diameter of the flow tube 31. A magnet 32 is positioned in the plummet 32 proximate its top end. The magnet 32 is preferably inside of the plummet 32. The plummet 32 may be made of any suitable material such as polypropylene. The plummet 32 is sized and configured to allow for liquid product 13 to flow around the plummet 32. The plummet 32 may have an elongate groove 32b which extends the length of the plummet 32 to allow for the passage of air. A sensor 33 is supported by suitable means, proximate the middle of the flow tube 31. The sensor 33 is operatively connected to a controller 34 which is used to time various functions, as will be described more fully hereafter as well as make appropriate calculations, which also will be described more fully hereafter. The sensor 33 senses the magnet 32a in the plummet 32. The flow tube 31 is preferably transparent and preferably made of a clear plastic. Further, the inner diameter of the flow tube 31 expands in diameter proximate where the sensor 33 is positioned. This allows for more flow of the product 13 around the plummet 32. Any suitable magnetic reed switch technology, or other methods of sensing the presence of the plummet 32 may be utilized.

Figure 2:
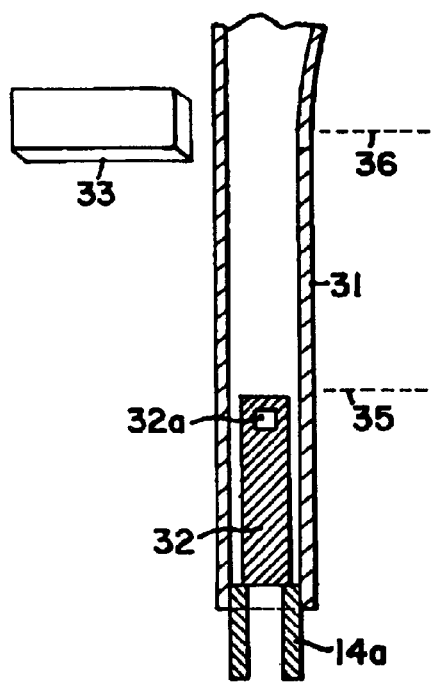
FIG. 2 is an enlarged schematic representation of the present invention shown in FIG. 1 when the dispensing system is in a first, no flow operation.
Figure 3:
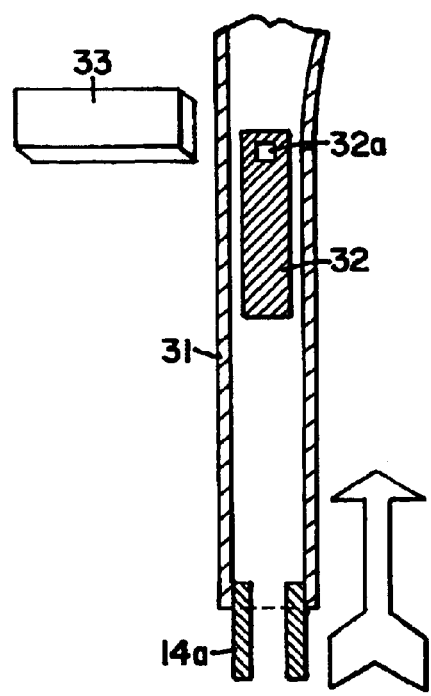
FIG. 3 is an enlarged schematic representation of the present invention when the dispensing system is in a flowing operational configuration.
Figure 4:
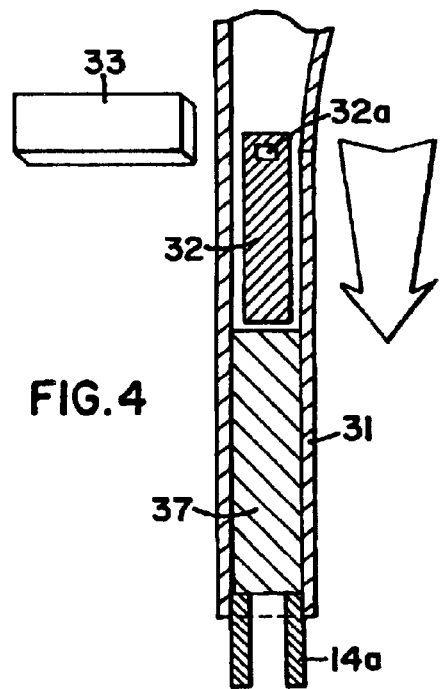
FIG. 4 is an enlarged schematic view of the present invention shown in a second, no flow condition.
Figure 6:
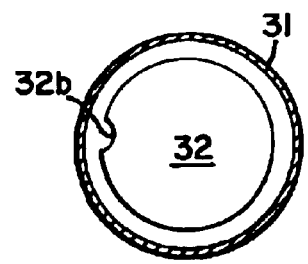
FIG. 6 is an enlarged cross-sectional view taken generally along the line 6—6 of FIG. 1.

In general, when there is no flow of liquid product 13, the plummet 32 will settle to the bottom and be supported on the connector 14a. When the constant volume pump 11 begins to pump a liquid product 13, the plummet 32 will raise up at a rate proportional to the flow. One example of such a constant volume pump is a peristaltic pump. After a certain amount of travel, the sensor 33 will sense the presence of the plummet 32. The time it takes for the plummet 32 to reach the sensor 33 and the total pumping time can be used to calculate the total volume of liquid delivered to the application. Referring to FIG. 2, where there is no flow, it can be seen that the plummet 32 is resting on the connector 14a. In FIG. 2, there is indicated a start line 35 and an operating line 36. The start line 35 is at the top of the plummet 32 when there is no flow. The operating line 36 is when the sensor 33 sees the plummet 32. The distance between the start line 35 and operating line 36 is the distance the plummet 32 travels. When the constant volume pump 11 begins to pump, the liquid product 13 will flow in the direction of the arrow in FIG. 3 and will raise the plummet 32 upwards. The increased diameter of the flow tube 31 will allow enough liquid 13 to pass around the plummet 32 so as not to raise the plummet 32 higher. The liquid 13 will then exit the tube 31 into the constant volume pump 11. Then, in FIG. 4, when the constant volume pump 11 ceases to pump the liquid product 13, the plummet 32 will sink downward, the direction of the arrow shown in FIG. 4. The volume under the plummet, inside of the flow tube 32, is designated as 37. This process may be more readily understood with reference to the flow chart of FIG. 5. It is necessary to know the sensor volume which is the volume under the plummet 32 when the sensor 33 is operated. This sensor volume is identified as "V". This is dependent upon the system that is used and can be measured. Similarly, the plummet sink rate (ml/sec) is the rate at which the liquid 13 moves around the plummet 32 and is designated as PSR. This can be determined by measuring the flow when the plummet 32 is held in a constant position (not resting on the bottom). The sensor time (sec) is the time it takes for the plummet 32 to reach the sensor 33 location once the pump 11 is turned on. This is designated as $T_S$. The flow rate (F) can then be calculated as follows: $F=(T_S*PSR+V)/(T_S)$ (ml/sec). If the pump 11 for the application is to be operated for $T_P$ seconds, then the total volume (Q) for the application would be: $Q=T_P*F$ (ml). The flow verification sensor apparatus 30 is designed to be used with low viscosity liquids. The dimensions of the flow tube 31 and plummet 32 will be specified to a predictable plummet sink rate. As different solutions with different densities and viscosity are used, the dimensions of the plummet and flow rube requirements may require adjustments.

Figure 5:
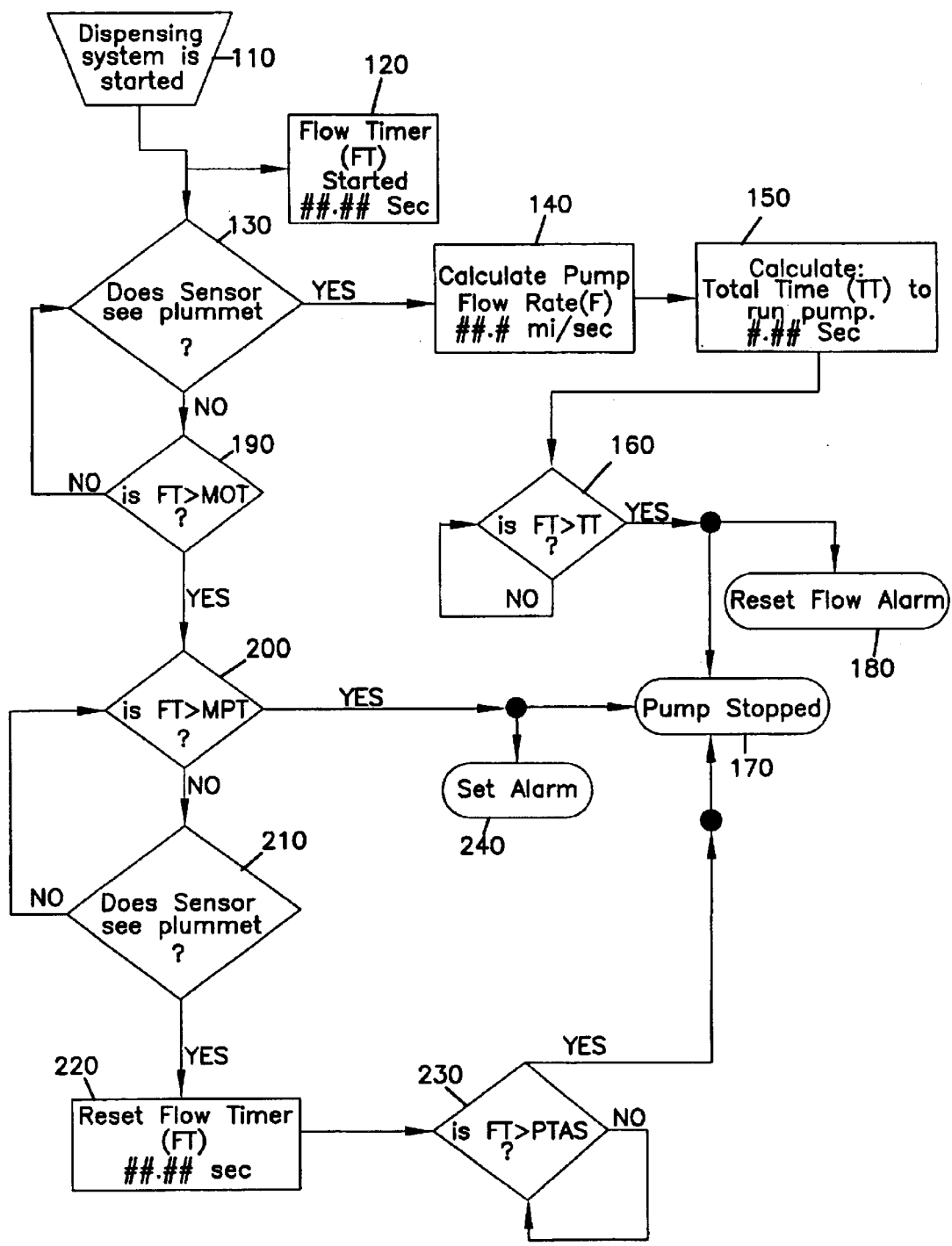
FIG. 5 is a flow diagram showing a method of using the invention shown in FIG. 1.

In understanding FIG. 5, it is necessary that a total volume required be determined. This is the amount of product 13 that is required for each application and will be dependent upon the application and product used. This maximum operating time is seconds (MOT) is arbitrarily determined. If, for instance, the pump would normally operate for five seconds. The maximum operating time may be set for seven seconds. The maximum priming time (MPT) is also in seconds and is again determined for each individual system and is the amount of time it takes for the liquid 13 to reach the sensor. The priming time after sensor (PTAS) is also in seconds and is the amount of time it takes to fill the tube from the sensor 33 to the specific application such as a ware washing machine.

The constant volume pump 11 is turned on (block 110) a flow timer (FT) is started (block 120) and is a running time in seconds. Then, in block 130, a determination is made whether or not the sensor 33 sees the plummet 32. If yes, the flow rate (F) in millimeters per second is calculated in block 140. Then, in block 150, the total time (TT) to run the pump 11 is calculated in seconds. This (TT) is the total volume required (Q) divided by the calculated flow rate (F). Then, in block 160, it is determined whether or not the flow timer is greater than the total time. When it is determined that it is greater, the pump 11 is stopped in block 170 and the flow alarm 50 is reset (if on) in block 180.

In block 190, when the sensor 33 does not see the plummet 32 in block 130, it is determined if the flow tinier is greater than the maximum operating time (MOT). If yes, in block 200, it is determined if the flow timer is greater than the maximum priming time MPT). If yes, the flow alarm 50 is set on in block 240 and the pump is stopped in 170. This would alert the operator to check the product flow failure condition. In block 200, if the flow timer is not greater than the maximum priming time, it is determined in block 210 if the sensor 33 sees the plummet 32. If yes (which indicates the system has been primed), the flow timer (FT) is reset in block 220 and then in block 230 i is determined if the flow timer is greater than the priming time after sensor (PTAS). This is necessary in order for the flow circuit to operate properly on the next cycle, the liquid between the application must now be filled. If yes, the pump stopped in block 170.

The following is an example based on delivering a sanitizer to a low temperature dishwashing machine. The calculations are based on the following:

| Calculation - Signal Based Time Sensor Goes Off | |
|---|---|
| Normal Pumping Rate (ml/min: | 72 |
| Normal Pumping Rate (ml/sec): | 1.20 |
| Pump Run Time (sec): | 5.00 |
| Plummet Sink Rate (ml/sec): | .20 |
| Alert Flow Rate Decrease (%): | 60% |
| Volume Under Plummet at Signal (ml): | 1.0 |
| Flow alert at (ml/sec): | .72 |
| Normal Delivery Volume (ml): | 6 |

The pump will run for five seconds and pump at a rate of 1.2 millimeters per second. The plummet rate is 0.2 millimeters per second so for every second the pump is on, the accumulated volume under the plummet will be increased by (1.2–0.2) (ml/seconds×1.0 second=1.0 millimeters.) Since the sensor is positioned at this location, it will cause the switch to operate at this volume.

The parameters for this particular flow of sensor are fixed so it is possible to predict the flow rate based on the time it takes the sensor to trigger. This is shown in the following table:

| Sensor Operation at (sec) | Estimated Flow Rate (ml/sec) | Predicted Delivered Volume (ml) |
|---|---|---|
| 0.6 | 1.867 | 9.33 |
| 0.7 | 1.629 | 8.14 |

-continued

| Sensor Operation at (sec) | Estimated Flow Rate (ml/sec) | Predicted Delivered Volume (ml) |
|---|---|---|
| 0.8 | 1.450 | 7.25 |
| 0.9 | 1.311 | 6.56 |
| 1.0 | 1.200 | 6.00 |
| 1.1 | 1.109 | 5.55 |
| 1.2 | 1.033 | 5.17 |
| 1.3 | 0.969 | 4.85 |
| 1.4 | 0.914 | 4.57 |
| 1.5 | 0.867 | 4.33 |
| 1.6 | 0.825 | 4.13 |
| 1.7 | 0.788 | 3.94 |
| 1.8 | 0.756 | 3.78 |
| 1.9 | 0.726 | 3.63 |
| 2.0 | 0.700 | 3.50 |
| 2.1 | 0.676 | 3.38 |

The last column in this table shows the predicted amount of liquid delivered to the application with the pumping time of five seconds. An alarm could be triggered if the sensor is not operated within two seconds of turning on the pump, meaning the flow is less than 60 percent of the normal flow rate (the last two entries). Also, the sensor could not operate for the first four entries as the pump cannot pump that fast.

In prior art devices, when it is necessary that the device be primed, it is often quite necessary for the user to continually press the on button to cycle the devices through several cycles in order to prime the device. As previously described, the present invention provides for a method of priming the dispensing system for a liquid product with only one activation of the system. Once the dispensing system is started in block 110, and the sensor does not see the plummet and the flow timer is greater than the maximum operating time, the system goes into a priming mode. The dispensing system continues in the priming mode until the flow timer is greater than the maximum priming time. At that point, when the flow timer is greater than the maximum priming time, an alarm is set on to indicate a problem unless prior to this time, the sensor sees the plummet (block 210). This then indicates the completion of the priming and the flow timer is reset and the pump continues to pump until the flow timer is greater than the priming time after sensor, at which time the pump is stopped. This allows for the priming of the device from the sensor up to the application. The pump is then stopped and the system is ready for dispensing.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A flow verification sensor apparatus, for use with a constant volume pump that pumps a liquid product from a container comprising:
   a) a flow tube having a bore, the flow tube having an upper end and a lower end, the upper end adapted and configured to be in fluid communication with the constant pump and the lower end adapted and configured to be in fluid communication with the liquid product;
   b) a plummet positioned in the bore of the flow tube;
   c) a sensor positioned proximate the flow tube and at an upward distance from the lower end;
   d) the plummet moveable from a first, at rest position to a second position, when the sensor senses the plummet; and
   e) a timer for measuring a length of time for the plummet to move from the first position to the second position after activation of the pump, the plummet being raised by flow of the liquid product.

2. The apparatus of claim 1, further comprising the flow tube being transparent, wherein the plummet is able to be seen.

3. The apparatus of claim 1, further comprising the plummet being generally cylindrical with an elongate groove.

4. The apparatus of claim 1, further comprising:
   a) the plummet having a magnet; and
   b) the sensor is a magnetic reed sensor.

5. The apparatus of claim 1, further comprising an alarm for signaling low flow and no flow of liquid product.

6. A dispensing system for dispensing a liquid product, comprising:
   a) a constant volume pump;
   b) a flow tube having a bore, the flow tube having an upper end and a lower end, the upper end adapted and configured to be in fluid communication with the constant volume pump and the lower end adapted and configured to be in fluid communication with the liquid product;
   c) a plummet positioned in the bore of the flow tube;
   d) a sensor positioned proximate the flow tube and at an upward distance from the lower end;
   e) a conduit having a first end in fluid communication with the lower end of the flow tube and a second end in fluid communication with the liquid product;
   f) the plummet moveable from a first, at rest position to a second position, when the sensor senses the plummet; and
   g) a timer for measuring a length of time for the plummet to move from the first position to the second position after activation of the pump.

7. The system of claim 6, further comprising the flow tube being transparent, wherein the plummet is able to be seen.

8. The system of claim 6, further comprising the plummet being generally cylindrical with an elongate groove.

9. The system of claim 6, further comprising:
   a) the plummet having a magnet; and
   b) the sensor is a magnetic reed sensor.

10. The system of claim 6, further comprising an alarm for signaling low flow and no flow of liquid product.

11. A method of priming a dispensing system for dispensing a liquid product, comprising:
    a) activating a pump for dispensing the liquid product;
    b) establishing a maximum priming time;
    c) positioning a plummet in a bore of a flow tube, through which the liquid product flows;
    d) positioning a sensor proximate the flow tube to sense the plummet rising in the flow tube due to flow of the liquid product;
    e) measuring flow time; and
    f) running the pump until the sensor senses the plummet or until the flow time exceeds the maximum priming time, whichever occurs first.

12. The method of claim 11, further comprising setting on an alarm when the flow time exceeds the maximum priming time.

13. The method of claim 12, further comprising:
    a) establishing the priming time after sensor is sensed;
    b) resetting the flow timer; and
    c) running the pump until the flow timer is greater than the priming time after sensor is sensed, where the system is primed from the sensor to the system's application.

* * * * *